(12) United States Patent
Barrick

(10) Patent No.: US 7,130,947 B2
(45) Date of Patent: Oct. 31, 2006

(54) METHOD OF ARBITRATION WHICH ALLOWS REQUESTORS FROM MULTIPLE FREQUENCY DOMAINS

(75) Inventor: Brian David Barrick, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 10/835,349

(22) Filed: Apr. 29, 2004

(65) Prior Publication Data
US 2005/0246464 A1 Nov. 3, 2005

(51) Int. Cl.
G06F 12/00 (2006.01)
G06F 13/14 (2006.01)
G06F 13/00 (2006.01)

(52) U.S. Cl. .......... 710/243; 711/151; 710/107; 710/240; 710/242; 710/244

(58) Field of Classification Search ........ 710/100–125, 710/240–244
See application file for complete search history.

(56) References Cited

U.S. PATENT DOCUMENTS

| 5,546,587 | A | * | 8/1996 | Silver ..................... 710/242 |
| 5,764,929 | A | * | 6/1998 | Kelley et al. ............ 710/107 |
| 5,862,387 | A | * | 1/1999 | Songer et al. ........... 710/240 |
| 6,151,655 | A | * | 11/2000 | Jones et al. ............. 710/244 |
| 6,401,176 | B1 | * | 6/2002 | Fadavi-Ardekani et al. 711/151 |

* cited by examiner

Primary Examiner—Rehana Perveen
Assistant Examiner—Brian Misiura
(74) Attorney, Agent, or Firm—Stephen J. Walder, Jr.; Diana R. Gerhardt; Robert M. Carwell

(57) ABSTRACT

The present invention provides a method of arbitration for resources which allows requestors from multiple frequency domains. Most requestors generate requests at full speed. A small number of low-speed requesters generate requests every two full-speed cycles, and hold their requests for two full-speed cycles. The arbitration method gives priority to the requests from the low-priority requesters and guarantees that two requests made by the half-speed requestors at the beginning of a low-speed cycle will be granted over the course of the low-speed cycle. The requests generated by the low-speed requestors are issued in phases. Issuance of later phases of a request is blocked when the request has been granted in an earlier phase.

23 Claims, 3 Drawing Sheets

METHOD OF ARBITRATION WHICH ALLOWS REQUESTORS FROM MULTIPLE FREQUENCY DOMAINS

TECHNICAL FIELD

The present invention relates generally to the allocation of resources in a processor and, more particularly, to a method of arbitration which allows requesters from multiple frequency domains and allows simultaneous grants for the lower-frequency requesters.

BACKGROUND

When several devices make conflicting requests for shared resources, the requests must be arbitrated to determine allocation of the resources. For example, when a bus is connected to a cache, cache allocate and snoop requests may be given priority for some applications and designs. For some of these designs, these requests can arrive simultaneously. This arbitration priority is application specific and other designs may choose to have a different priority.

Self-arbitration can be used to select among high-priority requests. For example, when there is both a reload and snoop request on the bus, one can be chosen. This method delays the other request until the first request is completed, which may be a matter of several cycles. Further, a self arbitration would add an additional arbitration point and make the requestors aware of the arbitration.

Therefore, there is a need for a method of arbitration for giving priority to high-priority requests, but with a lessened delay to the high-priority requests that are not selected.

SUMMARY OF THE INVENTION

The present invention provides a method of arbitration for resources which allows requesters from multiple frequency domains. Most requesters generate requests at full speed. A small number of low-speed requestors generate requests every two full-speed cycles, and hold their requests for two full-speed cycles. The arbitration method gives priority to the requests from the low-priority requesters and guarantees that two requests made by the half-speed requestors at the beginning of a low-speed cycle will be granted over the course of the low-speed cycle.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
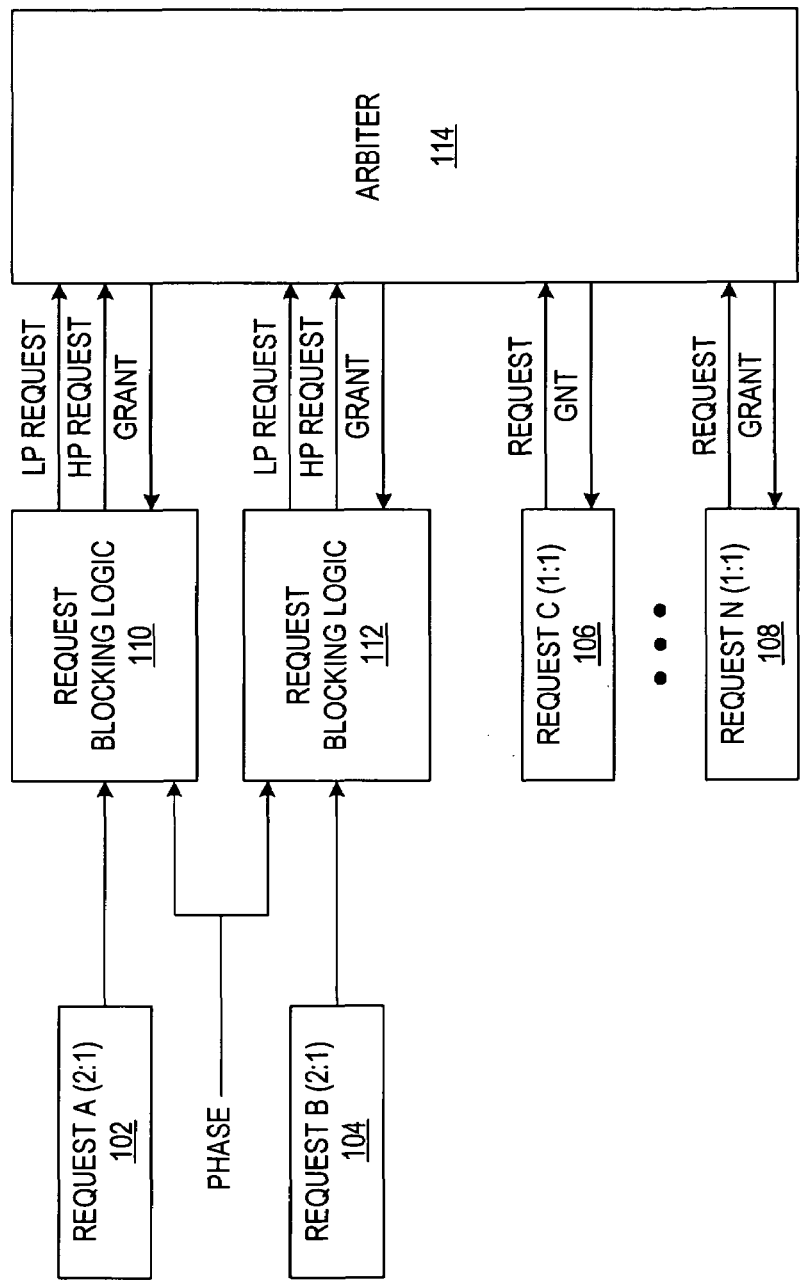
FIG. 1 shows a flow diagram illustrating the processing of requests for arbitration from full-speed requestors and slow speed requesters.

FIG. 1 shows a flow diagram illustrating the processing of requests for arbitration from full-speed requesters and slow speed requestors. The half-speed requesters generate requests every two full-speed cycles. Requests A 102, B 104, and C 106 through N 108 arrive for arbitration. Requests A 102 and B 104 are from half-speed requesters. The requests are active through two full speed cycles, and consist of two phases, one per cycle. The first phase, during the first full-speed cycle, is a low-priority request. The second phase, during the second full-speed cycle, is a high-priority request. It is blocked if the low-priority request was granted during the previous cycle.

Requests A 102 and B 104 pass to the request blocking logics 110 and 112. The request blocking logics 110 and 112 transmit low priority requests to the arbiter 114 during the first full-speed cycle of the request. Request A 102 is granted during the low-priority phase. During the second full-speed cycle of the request, the blocking logic 110 does not issue a high-priority request for request 102. Request B 104 was not granted during the low-priority phase. During the second full-speed cycle of the request, the blocking logic 112 issues the high-priority request phase for request 102, and the arbiter 114 grants it.

The arbiter 114 always prefers the low-speed requesters. If there are two low-priority requests during the first phase of the two-phase low-speed request cycle, the arbiter 114 grants one of them. If there is one request from a low-speed requester, either a low-priority request during the first phase of the two-phase low-speed request cycle or a high-priority request during the second phase of the two-phase low-speed request cycle, then the arbiter 114 grants it. If there are requests from the high-speed requestors but not from the low-speed requesters, then the arbiter 114 grants one of the requests from the high-speed requesters.

This method of arbitration guarantees that the two requests A 102 and B 104 from the low-speed requestors win arbitration, even if both are issued at the same time. One of the requests A 102 and B 104 will be granted during the first-phase of the two-phase low-speed request cycle, as a low-priority request. The other request will issued as a high-speed request during the second phase of the cycle, and will be granted. The request granted during the first phase of the two-phase cycle will not be issued as a high-speed request during the second cycle.

It further guarantees that all of the requests are granted within one low-speed cycle. Further, there is only one arbitration point, and this method allows the high-priority requestors to be totally unaware of any arbitration point at all. Provided that a resource is available whenever a requestor wins arbitration, the requests A 102 and B 104 do not require a grant, because they are always guaranteed to win arbitration at their half-speed domain, and have a resource available. Since they are guaranteed to win arbitration, these high-priority requesters can be designed to send their requests up without waiting for a grant from arbitration.

Figure 2A:
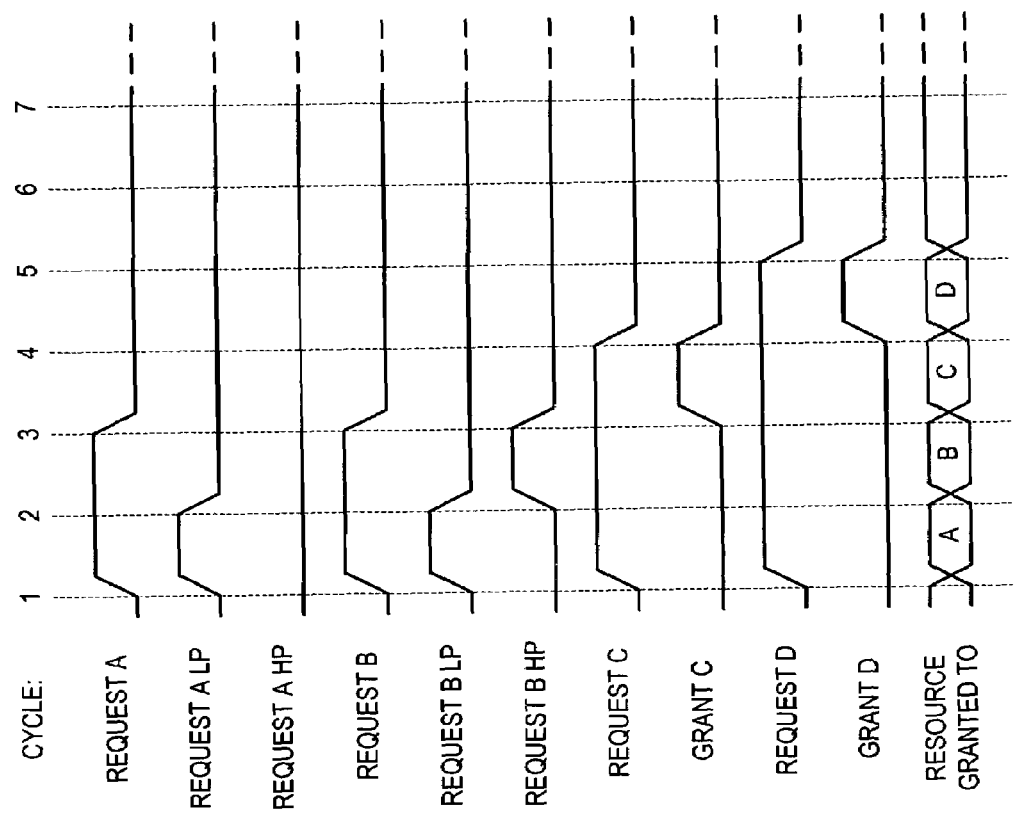
FIG. 2A shows a flow diagram illustrating the timing of the processing of requests for arbitration when there are two slow speed requests during a slow speed cycle.

FIG. 2A shows a flow diagram illustrating the timing of the processing of requests for arbitration when there are two slow speed requests during a slow speed cycle. During the first full-speed cycle, low-speed requesters issue requests A and B and high-speed requesters issue requests C and D. The requests A and B go to the blocking logics 110 and 112 and generate low-priority requests. The arbiter 114 grants one of them, in this case, request A. During full-speed cycle 2, the request B goes to the blocking logic 112, is generated as a high-priority request, and is granted by the arbiter 114. The blocking logic 110 blocks the high-priority request phase from request A. During cycle 3, the arbiter grants request C, from a high-speed requester. During cycle 4, the arbiter grants request d, from a high-speed requester. Under this method, requests from the low-speed requesters are given priority over the requests from the high-speed requesters. The requests A and B from low-speed requestors are granted before the requests C and D from the high-speed requestors. Further, both requests, A and B, from the low speed requesters are granted during a single low-speed cycle.

Figure 2B:
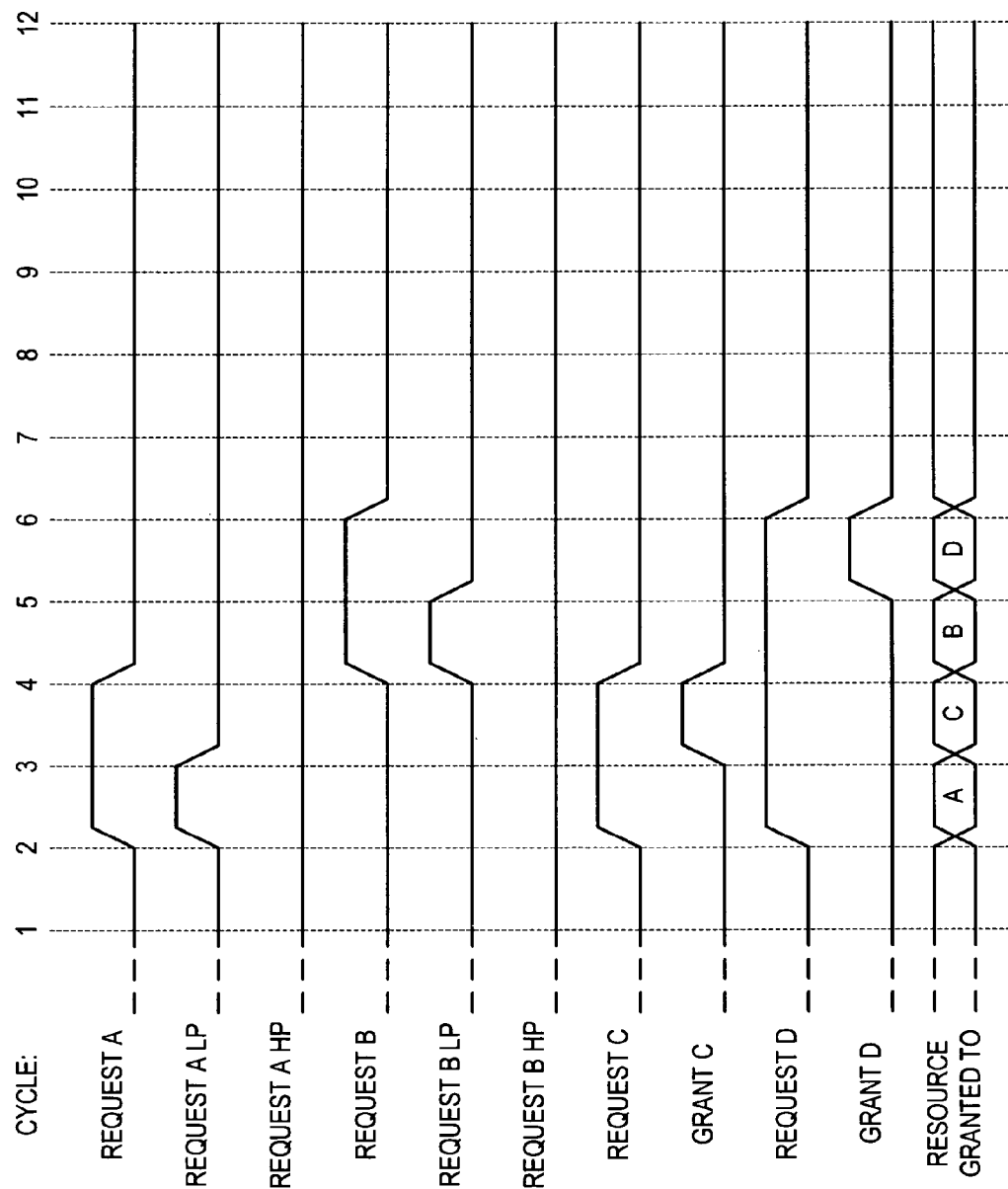
FIG. 2B shows a flow diagram illustrating the timing of the processing of requests for arbitration when there is one slow speed request during the first low-speed cycle.

FIG. 2B shows a flow diagram illustrating the timing of the processing of requests for arbitration when there is one slow speed request during the first low-speed cycle. During the first full-speed cycle, a low-speed requesters issue requests A and high-speed requesters issue requests C and D. The request A goes to a blocking logic, which generates a low-priority request, granted by the arbiter 114. During the second full-speed cycle, the second half of the half-speed cycle, the blocking logic blocks the high-priority phase of request A. The arbiter grants request C, from a high-speed requester C. During cycle 3, request B from a low-speed requester is issued as a low-priority request by a blocking logic and granted by the arbiter 114. During cycle 4, the arbiter grants request D from a high-speed requestor. The blocking logic blocks the high-priority phase of request B, because the low-priority request issued during the first phase of the low-speed cycle was granted. Thus, requests A, C, B, and D were granted in sequence. The requests from the low-speed requestors were given priority over the requests from the high-speed requesters, when there are requests from both speeds of requesters during the same cycle.

In an alternative embodiment, the low-speed requesters operate at one-third speed. Low-speed requests are issued every three high-speed cycles and last for three high-speed cycles. The low-speed requests consist of three phases. The blocking logics block requests during the latter phases when they had been granted during earlier phases. Again, the requests from low-speed requestors are given priority over the requests from high-speed requesters. Three requests made during a low-speed cycle are guaranteed to be granted.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A system to allow requestors of resources from multiple frequency domains comprising:
   one or more high-speed requestors configured to generate requests at a first frequency;
   at least two low-speed requestors configured to generate requests at a second frequency, wherein the second frequency is lower than the first frequency;
   an arbiter, wherein the arbiter is configured to arbitrate the requests of the low-speed requestors and the high-speed requestors; and
   blocking logic connected to the low-speed requestors, wherein requests generated by the low-speed requestors issue in phases of a low-speed cycle, and the blocking logic blocks a request from a first low-speed requestor in a later phase of the low-speed cycle when the request from the first low-speed requestor has been granted in an earlier phase of the low-speed cycle.

2. The system of claim 1, further comprising a phase signal means connected to the blocking logic, wherein the blocking logic, responsive to the phase signal means, identifies the phase of the low-speed cycle.

3. The system of claim 1, wherein the frequency of the high-speed requestors is an integer n times the frequency of the low-speed requestors.

4. The system of claim 3, wherein there are exactly the integer n low-speed requestors.

5. The system of claim 1, wherein the arbiter gives priority to requests from the low-speed requestors over requests from the high-speed requestors.

6. A method of arbitration for resources which allows requestors from two frequency domains, the method comprising the steps of:
   generating requests for the resources at a first frequency by one or more high-speed requestors;
   generating requests for the resources at a second frequency by at least two low-speed requestors, wherein the second frequency is lower than the first frequency;
   arbitrating, via an arbitrator, the requests for resources generated by the high-speed requestors and the low-speed requestors;
   issuing the requests generated by the low-speed requestors to the arbitrator over multiple phases of a low-speed cycle; and
   blocking the issuing, to the arbitrator, of a request generated by a first low-speed reguestor in later phases of the multiple phases when the request by the first low-speed requestor was granted in an earlier phase.

7. The method of claim 6, wherein the arbitration gives priority to requests generated by the low-speed requestors over requests generated by the high-speed requestors.

8. The method of claim 6, wherein the requests for resources generated by the low-speed requestors consist of two phases, and the frequency of generation of requests by the low-speed requestors is half the frequency of the generation of requests by the high-speed requestors.

9. The method of claim 6, wherein the requests for resources generated by the low-speed requestors consist of three phases, and the frequency of generation of requests by the low-speed requestors is one-third the frequency of the generation of requests by the high-speed requestors.

10. The method of claim 6, further comprising the step of issuing a signal which allows the arbitration to identify the phase of the requests generated by the low-speed requestors.

11. A computer program product for the arbitration of resources which allows requestors from two frequency domains, the computer program product having a medium with a computer program embodied thereon, the computer program comprising:

computer code for generating requests for the resources at a first frequency by one or more high-speed requestors;
    computer code for generating requests for the resources at a second frequency by at least two low-speed requestors, wherein the second frequency is lower than the first frequency; and
    computer code for arbitrating the requests for resources generated by the high-speed requestors and the low-speed requestors;
    computer code for issuing the requests generated by the low-speed requestors over multiple phases of a low-speed cycle; and
    computer code for blocking the issuing of a request generated by a first low-speed requestor in later phases of the multiple phases when the request by the first low-speed requestor was granted in an earlier phase.

12. The computer program product of claim 11, wherein the arbitration gives priority to requests generated by the low-speed requestors over requests generated by the high-speed requestors.

13. The computer program product of claim 11, wherein the requests for resources generated by the low-speed requestors consist of two phases, and the frequency of generation of requests by the low-speed requestors is half the frequency of the generation of requests by the high-speed requestors.

14. The computer program product of claim 11, wherein the requests for resources generated by the low-speed requestors consist of three phases, and the frequency of generation of requests by the low-speed requestors is one-third the frequency of the generation of requests by the high-speed requestors.

15. The computer program product of claim 11, further comprising computer code for issuing a signal which allows the arbitration to identify the phase of the requests generated by the low-speed requestors.

16. The system of claim 1, wherein a request from a second low-speed requester is issued from the blocking logic to the arbitrator in the later phase of the low-speed cycle when the request from the second low-speed requestor was not issued by the blocking logic to the arbitrator in the earlier phase of the low-speed cycle.

17. The system of claim 16, wherein the request from the second low-speed requestor is issued by the blocking logic to the arbitrator as a high priority request in the later phase of the low-speed cycle.

18. The system of claim 1, wherein:
    the first request from the first low-speed requestor is issued by the blocking logic to the arbitrator and granted by the arbitrator during a first cycle,
    a second request from a second low-speed requestor is issued by the blocking logic to the arbitrator as a high priority request and granted by the arbitrator during a second cycle,
    the first request from the first low-speed requestor is blocked by the blocking logic during the second cycle, and
    a third request from the one or more high-speed requestors is granted by the arbitrator during a third cycle.

19. The method of claim 6, wherein a request from a second low-speed requestor is issued to the arbitrator in the later phase of the low-speed cycle when the request from the second low-speed requestor was not issued in the earlier phase of the low-speed cycle.

20. The method of claim 19, wherein the request from the second low-speed requestor is issued to the arbitrator as a high priority request in the later phase of the low-speed cycle.

21. The method of claim 6, wherein:
    the first request from the first low-speed requestor is issued to the arbitrator and granted by the arbitrator during a first cycle,
    a second request from a second low-speed requestor is issued to the arbitrator as a high priority request and granted by the arbitrator during a second cycle,
    the first request from the first low-speed requestor is blocked during the second cycle, and
    a third request from the one or more high-speed requestors is granted by the arbitrator during a third cycle.

22. The computer program product of claim 11, wherein a request from a second low-speed requestor is issued to the arbitrator in the later phase of the low-speed cycle when the request from the second low-speed requestor was not issued in the earlier phase of the low-speed cycle.

23. The computer program product of claim 11, wherein:
    the first request from the first low-speed requestor is issued to the arbitrator and granted by the arbitrator during a first cycle,
    a second request from a second low-speed requestor is issued to the arbitrator as a high priority request and granted by the arbitrator during a second cycle,
    the first request from the first low-speed, requestor is blocked during the second cycle, and
    a third request from the one or more high-speed requestors is granted by the arbitrator during a third cycle.

* * * * *